United States Patent Office 3,174,728
Patented Mar. 23, 1965

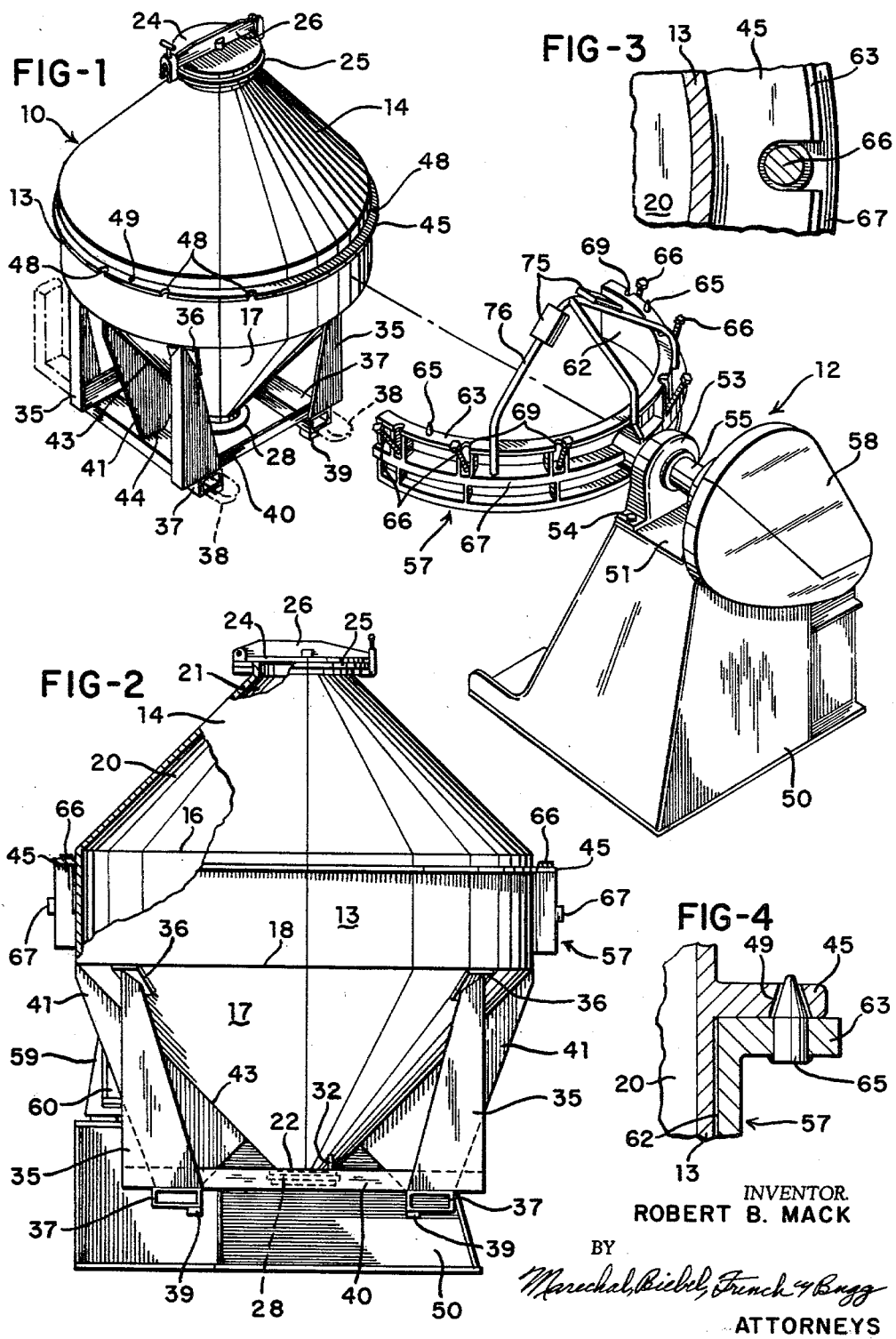
March 23, 1965 R. B. MACK 3,174,728
BLENDING APPARATUS
Filed Feb. 28, 1963 2 Sheets-Sheet 1
INVENTOR.
ROBERT B. MACK

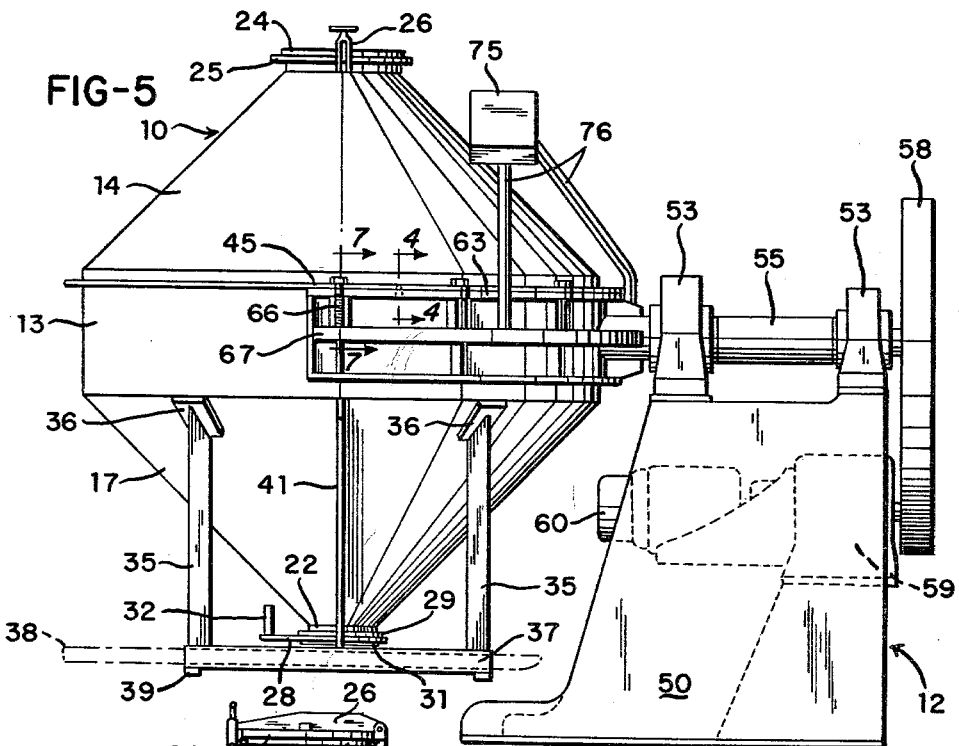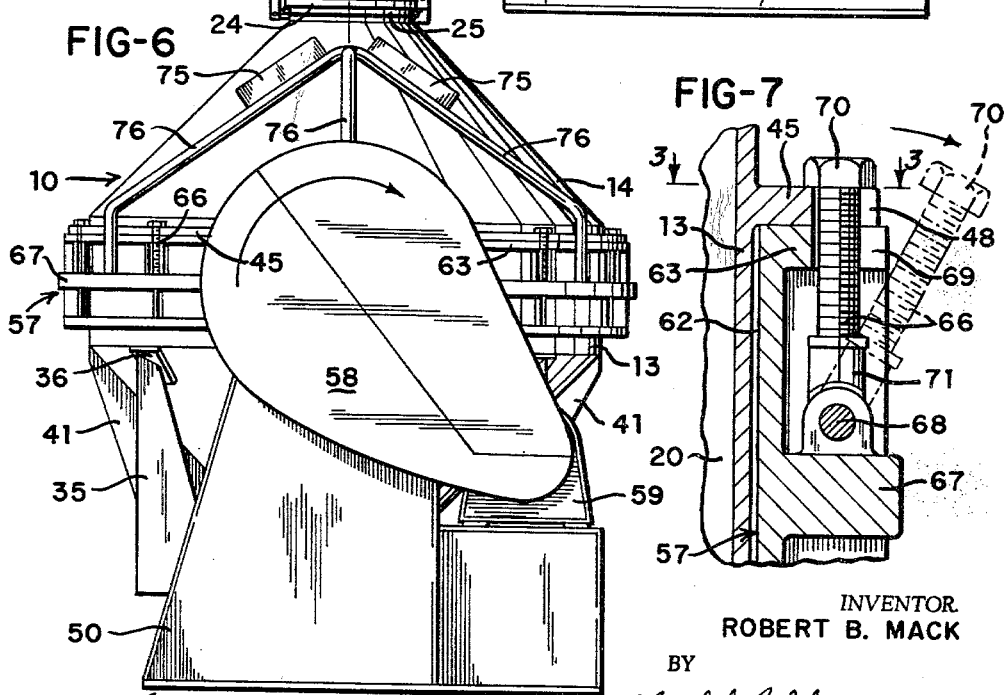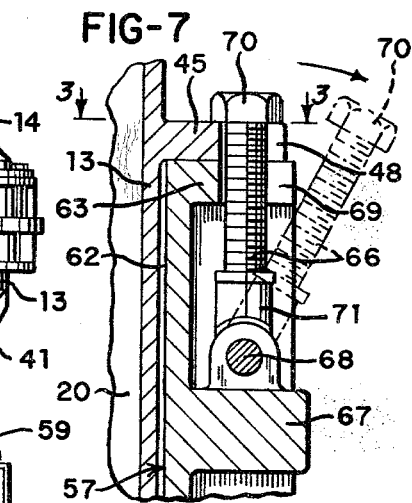

3,174,728
BLENDING APPARATUS
Robert B. Mack, Chester, W. Va., assignor to Patterson Industries, Inc., a corporation of Ohio
Filed Feb. 28, 1963, Ser. No. 261,791
6 Claims. (Cl. 259—3)

This invention relates to mixing apparatus, and particularly to a large industrial blender for thoroughly mixing powdered or granular solid material with other solid or liquid materials.

An important object of this invention is to provide a blending apparatus having a permanent or stationary rotation device and a portable mixing container which can be easily and quickly secured to the rotation device, and particularly to apparatus of this type which is quite flexible and efficient in its use so that all components of the apparatus can be utilized continuously.

Another object of this invention is to provide mixing apparatus of the above type with a hopper or container that facilitates transportation and handling thereof, and particularly to such a hopper having an internal configuration which causes thorough and complete mixing of the contents, as well as facilitates withdrawal of the mixed material therefrom.

A further object of this invention is to provide blending apparatus including a plurality of hoppers each of which is capable of being transported with ease by conventional lift trucks to and from a blender which rotates the hoppers for mixing the contents thereof, and further to provide apparatus of the character which is simple and rugged in design, and therefore dependable in operation and inexpensive to manufacture.

Further objects and advantages of the invention will be apparent from the following description, the accompanying drawings and the appended claims.

In the drawings—

FIG. 1 is a perspective view of applicant's blender combination showing the blender hopper separated from the blender drive unit;

FIG. 2 is a front elevation view of the blender combination with a portion of the hopper broken away to illustrate the smooth internal surfaces thereof;

FIG. 3 is a sectional view taken essentially along the line 3—3 of FIG. 7;

FIG. 4 is another sectional view taken essentially along the line 4—4 of FIG. 5;

FIG. 5 is a side elevation view of the blender combination as shown in FIG. 2;

FIG. 6 is a rear elevation view of the invention looking from right to left in FIG. 5; and FIG. 7 is a sectional view taken essentially along the line 7—7 of FIG. 5.

Referring to the drawings wherein a preferred embodiment of the invention is illustrated, FIG. 1 shows blender apparatus in accordance with the invention, including a portable blender body or hopper 10 which is adapted to be releasably secured to the blender drive unit 12 for rotation about a horizontal axis. Since the hopper 10 can be releasably secured to the drive unit 12, the unit can be continuously utilized for blending the contents of any number of separate blender hoppers 10. A manufacturer will generally utilize one drive unit 12 with a substantial number of hoppers 10 so that the shut down time of the drive unit 12 is held to a minimum thus increasing the operational efficiency of the equipment.

The hopper 10 includes a central annular section or ring 13 having an upper frusto-conical section 14 with its larger end integrally welded to the upper edges 16 of the ring 13. In a similar manner, a lower frusto-conical section 17 has its larger end integrally connected to the lower edges 18 of the ring 13, thus defining a mixing chamber 20. The smaller ends of the upper and lower sections 14 and 17 have openings 21 and 22 therein, with closure devices associated therewith for sealing the chamber 20. Thus the opening 21 in the upper section 14 is closed by a plate 24 which engages the flange 25 around this opening 21, and the locking member 26 releasably secures the plate 24 in the closed position. The opening 22 in the lower section 17 has a slide valve 28 which reciprocates between the flange 29 and the support plate 31 in response to manual force applied to the handle 32 to open and close this opening.

The internal surfaces of the blender hopper 10, as shown in FIG. 2, are substantially smooth and free of the usual vanes or deflectors. When in use, the mixing chamber 20 is filled through the upper opening 21 to a level substantially even with the edge 16 of annular ring 13 so that rotation of the hopper 10 about a horizontal axis causes the contents of the chamber 20 to be thoroughly mixed and blended. That is, as the blender body 10 is rotated, the contents flow between the upper and lower sections 14 and 17 so that as they fall onto the inner side walls of the frusto-conical sections, a horizontal force is imparted to this material which combines with the vertical and angular forces caused by the hopper rotation to thoroughly mix the material in the container.

The four support legs 35 are rigidly secured to the lower frusto-conical section 17 immediately below the juncture of this lower section with the annular ring 13 for supporting the blender hopper 10 in an upright manner. A plate 36 is secured to the upper end of each leg 35, and these plates are smoothly curved to correspond to the outer surface of the lower section 17 to facilitate welding of the plate 36 to the hopper 10. The lower ends of the legs 35 have secured thereon a pair of elongated tubular members 37 each of which has a rectangular cross-section of sufficient size for receiving a fork 38 of a conventional fork lift truck so that the hopper 10 can be lifted and transported by such a truck. The spacing blocks 39 (FIG. 5) may be provided on the lower surface of the tubular members 37 to facilitate insertion of the forks 38.

The horizontal braces 40 interconnect the opposite ends of the tubular members 37 for locking them together thus adding rigidity to the legs 35. Similarly, the triangular side plates 41 are weldably secured along their side edges 43 to the lower section 17 of the hopper 10, and along the bottom edge 44 to the member 37 for interconnecting the tubular members 37 and the lower frusto-conical section 17 thus strengthening the support structure for the hopper 10.

The annular mounting flange 45 extends radially from a rigid connection with the annular ring 13 near the upper edge 16 thereof for use in securing the blender hopper 10 to the drive unit 12, as will be described. This flange has a plurality of elongated radial slots 48 (see FIGS. 1 and 3) which are open to the outermost edge thereof, and a precisely positioned guide aperture 49 is provided in this flange 45 near each end thereof, as shown in FIGS. 1 and 5, for aligning the hopper 10 with the blender 12.

The blender drive unit 12 includes a stationary base 50 having a flat upper surface 51 with a pair of bearing blocks 53 rigidly secured thereto by the bolts 54. The axes of these bearing blocks are aligned for supporting the horizontal drive shaft 55 which has the cantilever support yoke 57 secured to one end thereof. As shown in FIG. 5, the other end of the shaft 55 is drivingly connected through the sealed drive chain 58 and the gear reduction unit 59 to the drive motor 60 which is thus capable of rotating the yoke 57. Suitable electrical controls and safety devices, none of which are shown, are provided for the motor 60 to effect automatic operation thereof.

The cantilever yoke 57 is semi-circular in configuration and has a smooth inner surface 62 which complements the outer surface of the annular ring 13. A radially outwardly extending flange 63 is provided on the upper edge of this yoke 57, and the flange has a radial dimension substantially equal to the support flange 45 on the body 10. A hopper 10 thus can be placed on the blender 12 with surface of the ring 13 against the inner surface 62 of the yoke 57, and the support flange 45 supported on the flange 63. The guide pins 65 are rigidly secured to the upper flange 63, and extend through the aligned apertures 49 (see FIG. 4) in the support flange 45 thereby insuring proper location of the blender body 10 on the yoke 57.

The locking bolts 66 (see FIG. 7) are secured to the central flange 67 on the yoke 57 by the pivot pins 68 for rotation from an inactive horizontal position between an upright position wherein the bolts 66 extend into aligned slots 48 and 69 in the support and upper flanges 45 and 63, respectively. The heads 70 on the bolts 66 are substantially larger than the width of the slots 48 so that when the bolts are tightened into the nut portions 71, the flanges 45 and 63 are locked securely together, and as a result, the hopper 10 is rigidly secured to the blender 12. The counterweights 75 are supported above the yoke 57 by the three rods 76, and these weights substantially balance the torque exerted by the legs 35, the tubular members 37, and the braces 41 when the body 10 is rotated so that the stresses imposed on the hopper 10 and blender drive unit 12 during rotation are held to a minimum. It is within the scope of the invention to place these weights on the upper section 14 of the hopper 10 in such a manner that they accomplish the above functional requirements.

In operation, the hoppers 10 can be readily lifted, transported, and stored, with or without contents, since the tubular members 37 readily receive the forks 38 of a conventional lift truck. When being lifted or carried by such a truck, the blender hopper 10 is in no danger of falling off the forks 38 since the tubular members 37 prohibit movement of the hopper 10 on the forks except in a direction to withdraw these forks. It is possible to position a hopper 10 full of mixed material above a work station so that a worker can withdraw the contents thereof as needed by manual operation of the slide valve 28. An important feature of the invention is the ability of the hopper 10 to be completely emptied as a result of the smooth surfaces of the mixing chamber 20 which taper to the outlet opening 22 so that gravity will empty the entire hopper when the valve 28 is opened.

To mix a batch of material, the blender hopper 10 is conveyed by a lift truck to the supply points wherein the various materials are measured and poured into the mixing chamber 20 through the upper opening 21. These materials can be added equally as well at a single station or at several different stations due to the ease at which the hopper 10 is conveyed. The materials fill the hopper 10 only to a level which approaches the edge 16 at the juncture of the annular ring 13 and the upper frusto-conical section 14, so that the entire inner surfaces of the upper and lower sections 14 and 17 are available to provide the mixing operation described above when the hopper 10 is rotated.

When filled, the cover 24 is locked in place and the blender hopper 10 transported to the blender 12, where the lift truck places the hopper on the yoke 57 with the flange 45 resting on the upper flange 63 of the yoke, and the guide pins 65 extending through the guide bores 49. The several lock bolts 66 are then rotated to a vertical position into the slots 48 and 69, and a suitable wrench is used to screw the bolts 66 into the nut portions 71 and thus lock the hopper 10 on the yoke 57.

The drive motor 60 is then energized to effect rotation of the yoke 57 and hopper 10 about a horizontal axis thereby thoroughly blending the materials in the hopper. After the mixing is completed, the motor 60 is deenergized with the hopper 10 in a vertical upright position, and then the forks 38 of a lift truck inserted into tubular members 37. The lock bolts 66 are then released and the hopper 10 is removed and conveyed to storage or a work station.

Thus the invention has provided blending apparatus which provides the utmost in handling flexibility and efficiency for maximum utilization of the drive unit and the hopper by a manufacturer. The blender drive unit can be maintained in operation for substantially longer periods than heretofore known, and the hoppers 10 can be transported, stored, filled, emptied, and rotated with ease. The entire apparatus is rugged in design for maximum dependability, as well as being simple in construction for lower cost.

The portable hopper 10 has many uses, such as blending a product and storing it for future use, with the ability to reblend after storage without transporting the product from the container. Moreover, the invention will blend an explosive product that cannot be readily handled by dumping and transporting and can be handled by leaving in the same container until the ultimate use.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Blending apparatus comprising, a portable hopper including a tubular ring of predetermined diameter having its axis disposed vertically, an upper frusto-conical section having a diameter at its larger end equal to said predetermined diameter, said larger end being integrally connected to the upper edges of said annular ring, a lower frusto-conical section substantially identical to said upper section and having its larger end integrally connected to the lower edges of said ring, said ring and said sections defining a mixing chamber having smooth internal surfaces for thoroughly blending the contents thereof when rotated about an axis perpendicular to the axis of said hopper, openings at the smaller end of both said sections, valve means associated with each of said openings for controlling the flow therethrough, leg means on said lower conical section for supporting said hopper with the axes of said conical sections disposed vertically and for receiving the forks of a fork lift truck to lift and transport said hopper, said leg means being spaced from below said opening in said lower section for unrestricted downward flow from said hopper, a radially outwardly extending flange on said tubular ring, a stationary blender including a base, a horizontal drive shaft on said base extending to one side thereof, a semi-circular shaped support member on said one end of said drive shaft, said support member having an inside configuration equal to the outer configuration of said ring and adapted to engage said hopper adjacent said ring and immediately below said flange to support said hopper, means for securing said hopper to said flange, and means for rotating said drive shaft, said support member and said hopper to blend the contents of said hopper.

2. Blending apparatus comprising, a portable hopper including a tubular ring of predetermined diameter having its axis disposed vertically, an upper frusto-conical section having a diameter at its larger end equal to said predetermined diameter, said larger end being integrally connected to the upper edges of said annular ring, a lower frusto-conical section substantially identical to said upper section and having its larger end integrally connected to the lower edges of said ring, said ring and said sections defining a mixing chamber having smooth internal surfaces for thoroughly blending the contents thereof when rotated about an axis perpendicular to the axis of said hopper, openings at the smaller end of both said sections, valve means associated with each of said openings for controlling the flow therethrough, downwardly extending leg means on said lower conical section, a pair of horizontal tubular members secured to said leg means for supporting said hopper with the axes of said conical sections disposed vertically, said tubular members being parallel and spaced apart a predetermined distance for receiving the forks of a fork lift truck to lift and transport said hopper, said tubular members being spaced from directly below said opening in said lower section for unrestricted downward flow from said hopper, a radially outwardly extending flange on said ring therein, a stationary blender including a base, a horizontal drive shaft on said base extending to one side thereof, a semi-circular support member on said one end of said drive shaft, said support member having an inside configuration equal to the outer configuration of said ring and adapted to engage said hopper adjacent said ring and immediately below said flange to support said hopper, means for securing said hopper to said flange, and means for rotating said drive shaft, said support member, and said hopper to blend the contents of said hopper.

3. Blending apparatus comprising, a portable hopper including a tubular ring of predetermined diameter having its axis disposed vertically, an upper frusto-conical section having a diameter at its larger end equal to said predetermined diameter, said larger end being integrally connected to the upper edges of said annular ring, a lower frusto-conical section substantially identical to said upper section and having its larger end integrally connected to the lower edges of said ring, said ring and said sections defining a mixing chamber having smooth internal surfaces for thoroughly blending the contents thereof when rotated about an axis perpendicular to the axis of said hopper, an opening at the smaller end of said lower section for emptying said hopper, valve means associated with said opening for controlling the flow therethrough, leg means for supporting said hopper with the axes of said conical sections disposed vertically and for receiving the forks of a fork lift truck to lift and transport said hopper, said leg means being spaced from below said opening in said lower section for unrestricted downward flow from said opening, a stationary blender including a base, a horizontal drive shaft on said base extending to one side thereof, a semi-circular shaped support member on said one end of said drive shaft, said support member having an inside configuration equal to the outer configuration of said ring and adapted to engage said hopper adjacent said ring, fastening means for securing said hopper to said support member, counterweight means on the said support member for balancing the weight of said leg means when said hopper is rotated by said blender, and means for rotating said drive shaft, said support member and said hopper to blend the contents of said hopper.

4. Blending apparatus comprising a portable hopper including upper and lower conical portions having its larger ends integrally connected to opposite ends of an annular ring member to define a mixing enclosure, two pairs of downwardly extending legs on said lower conical portion, a horizontal tubular member secured to each pair of said legs for supporting said hopper with the axes of said conical portions disposed vertically, said tubular members being parallel and spaced apart a predetermined distance so that the forks of a fork lift truck can be inserted thereinto to lift and transport said hopper, a radially outwardly extending flange on said ring member having a plurality of open ended radial slots therein, a stationary blender including a base, a horizontal drive shaft on said base extending to one side thereof, means for rotating said drive shaft, a semi-circular shaped support member on said one end of said drive shaft, said support member having an inside diameter equal to the outer diameter of said ring member and adapted to engage said hopper adjacent said ring member and below said flange to support said hopper, pivotal screw members on said support member in alignment with said slots when said hopper is supported by said support member for securing said hopper to said support member for rotation thereof, and alignment means for aligning said slots with said screw members.

5. Blending apparatus comprising a portable hopper having upper and lower conical portions having its larger ends integrally connected to opposite ends of an annular ring member to define a mixing enclosure, two pairs of downwardly extending legs on said lower conical portion, a horizontal tubular member secured to each pair of said legs for supporting said hopper with the axes of said conical portions disposed vertically, said tubular members being parallel and spaced apart a predetermined distance so that the forks of a fork lift truck can be inserted thereinto to lift and transport said hopper, means defining an outlet opening in said lower conical portion, a slide valve on said lower portion for controlling the flow through said outlet opening, said tubular members being spaced from below said valve for unrestricted downward flow from said hopper, a stationary blender including a base, a horizontal drive shaft on said base extending to one side thereof, means for rotating said drive shaft, a semi-circular shaped support member on said one end of said drive shaft, said support member having an inside configuration complementary to the outer configuration of said ring member and adapted to engage said hopper adjacent said ring member, means for securing said hopper to said support member for rotation thereof, and alignment means for aligning said portable hopper on said support member.

6. Blending apparatus comprising a portable hopper having upper and lower conical portions having its larger ends connected to opposite ends of an annular ring member to define a mixing enclosure, support structure secured and extending downwardly from said lower conical portion for supporting said hopper with the axes of said conical portions disposed vertically, a manually actuated slide valve at the smaller end of said lower portion for emptying the contents of said hopper, said support structure being spaced from below said valve for unrestricted downward flow from said valve, a radially outwardly extending flange on said ring member, a stationary blender including a base, a horizontal drive shaft on said base extending to one side thereof, means for rotating said drive shaft, a yoke-shaped support member on said one end of said drive shaft, said support member having an inside configuration similar to the outer configuration of said ring member and adapted to engage said hopper adjacent said ring member and below said flange to support said hopper, and lock means on said support member for cooperation with said ring member when said hopper is supported by said support member for securing said hopper to said support member for rotation thereof.

References Cited by the Examiner
UNITED STATES PATENTS

| 227,239 | 5/80 | Frentress | 259—89 |
|---|---|---|---|
| 2,722,339 | 11/55 | Saxon | 259—81 |

WALTER A. SCHEEL, *Primary Examiner.*